United States Patent
Kilian

(10) Patent No.: US 7,574,525 B2
(45) Date of Patent: Aug. 11, 2009

(54) SYSTEM AND METHOD FOR MANAGING COMMUNICATION BETWEEN SERVER NODES CONTAINED WITHIN A CLUSTERED ENVIRONMENT

(75) Inventor: Frank Kilian, Mannheim (DE)

(73) Assignee: SAP - AG, Walldorf (DE)

( * ) Notice: Subject to any disclaimer, the term of this patent is extended or adjusted under 35 U.S.C. 154(b) by 1003 days.

(21) Appl. No.: 10/750,280

(22) Filed: Dec. 30, 2003

(65) Prior Publication Data

US 2005/0165910 A1 Jul. 28, 2005

(51) Int. Cl.
G06F 15/173 (2006.01)
(52) U.S. Cl. .................... 709/238; 709/230
(58) Field of Classification Search .............. 709/238
See application file for complete search history.

(56) References Cited

U.S. PATENT DOCUMENTS

| | | | |
|---|---|---|---|
| 4,939,724 A * | 7/1990 | Ebersole | |
| 6,954,757 B2 * | 10/2005 | Zargham et al. | |
| 7,114,170 B2 * | 9/2006 | Harris et al. | 725/34 |
| 7,197,533 B2 * | 3/2007 | Vincent et al. | |
| 7,302,609 B2 * | 11/2007 | Matena et al. | 714/15 |
| 2002/0078132 A1 * | 6/2002 | Cullen et al. | |
| 2003/0018887 A1 * | 1/2003 | Fishman et al. | 713/151 |
| 2003/0037148 A1 * | 2/2003 | Pedersen | 709/227 |
| 2003/0200321 A1 * | 10/2003 | Chen et al. | 709/229 |
| 2004/0146056 A1 * | 7/2004 | Martin | 370/401 |
| 2004/0153558 A1 * | 8/2004 | Gunduc et al. | 709/229 |
| 2005/0108395 A1 * | 5/2005 | Brey et al. | 709/225 |

OTHER PUBLICATIONS

Non-Final Office Action for U.S. Appl. No. 10/750,002, Mailed Feb. 5, 2009, 23 pages.*
Rohland, Hans-Christoph , et al., Non-Final Office Action dated Oct. 3, 2007, U.S. Appl. No. 10/750,002, filed Dec. 30, 2003, 26 pgs.*
Rohland, Hans-Christoph , et al., Final Office Action dated Apr. 14, 2008, U.S. Appl. No. 10/750,002, filed Dec. 30, 2003, 26 pgs.*

* cited by examiner

Primary Examiner—Jeffrey Pwu
Assistant Examiner—Shaq Taha
(74) Attorney, Agent, or Firm—Blakely, Sokoloff Taylor & Zafman

(57) ABSTRACT

A method and a corresponding system for managing communication between multiple instances contained within a clustered environment. The method includes generating a packet to be transmitted from a non-Java-based server node to a Java-based server node. The non-Java-based server node specifies in a header of the packet [1] a destination server node and [2] information to indicate that the packet originated from the non-Java-based server node. The method further includes forwarding the packet from the non-Java-based server node to an intermediate server. Once the intermediate server receives the packet, the intermediate server examines the header of the packet and forwards the packet to the Java-based server node based on the destination information provided in the header of the packet.

29 Claims, 5 Drawing Sheets

SYSTEM AND METHOD FOR MANAGING COMMUNICATION BETWEEN SERVER NODES CONTAINED WITHIN A CLUSTERED ENVIRONMENT

BACKGROUND

1. Field

Embodiments of the invention relate to managing communication between multiple server nodes contained within a clustered environment.

2. Background

A clustered system may include a collection of servers and other components that are arranged to cooperatively perform computer-implemented tasks, such as providing client computers with access to a set of services and resources. The clustered system may be used in an enterprise software environment to handle a number of tasks in parallel. Typically, load balancing algorithm is implemented within the cluster to distribute incoming requests from the client computers evenly among multiple server nodes. In some cases, a single server node in the cluster may handle requests from a client computer. In other cases, the requests received from a client computer are handled by more than one server node cooperating with one another to perform the requested tasks.

One aspect of a clustered system is scalability. The system has the flexibility to enable adding cluster elements to the clustered system. In some cases, it may be desirable to incorporate new cluster elements that use recently developed hardware and/or software technologies. In such cases, a problem may arise if the communication protocol used by preexisting cluster elements (e.g., preexisting servers) is different from the communication protocol used by the recently added cluster elements. For example, if preexisting servers within a clustered system cannot effectively communicate with recently added servers, the preexisting and recently added servers may not be capable of cooperatively handling requests received from client computers.

SUMMARY

In accordance with one embodiment of the invention, a method and a corresponding system are disclosed for managing communication between multiple instances contained within a clustered environment. The method includes generating a packet to be transmitted from a non-Java-based server node to a Java-based server node. The non-Java-based server node specifies in a header of the packet [1] a destination server node and [2] information to indicate that the packet originated from the non-Java-based server node. The method further includes forwarding the packet from the non-Java-based server node to an intermediate server. Once the intermediate server receives the packet, the intermediate server examines the header of the packet and forwards the packet to the Java-based server node based on the destination information provided in the header of the packet.

BRIEF DESCRIPTION OF THE DRAWINGS

The invention is illustrated by way of example and not by way of limitation in the figures of the accompanying drawings in which like references indicate similar elements. It should be noted that the references to "an" or "one" embodiment of this disclosure are not necessarily to the same embodiment, and such references mean at least one.

DETAILED DESCRIPTION

In the following description, specific details are set forth. However, it is understood that embodiments of the invention may be practiced without these specific details. In other instances, well-known hardware and software components, structures, techniques and methods have not been shown in detail to avoid obscuring the understanding of this description.

Figure 1:
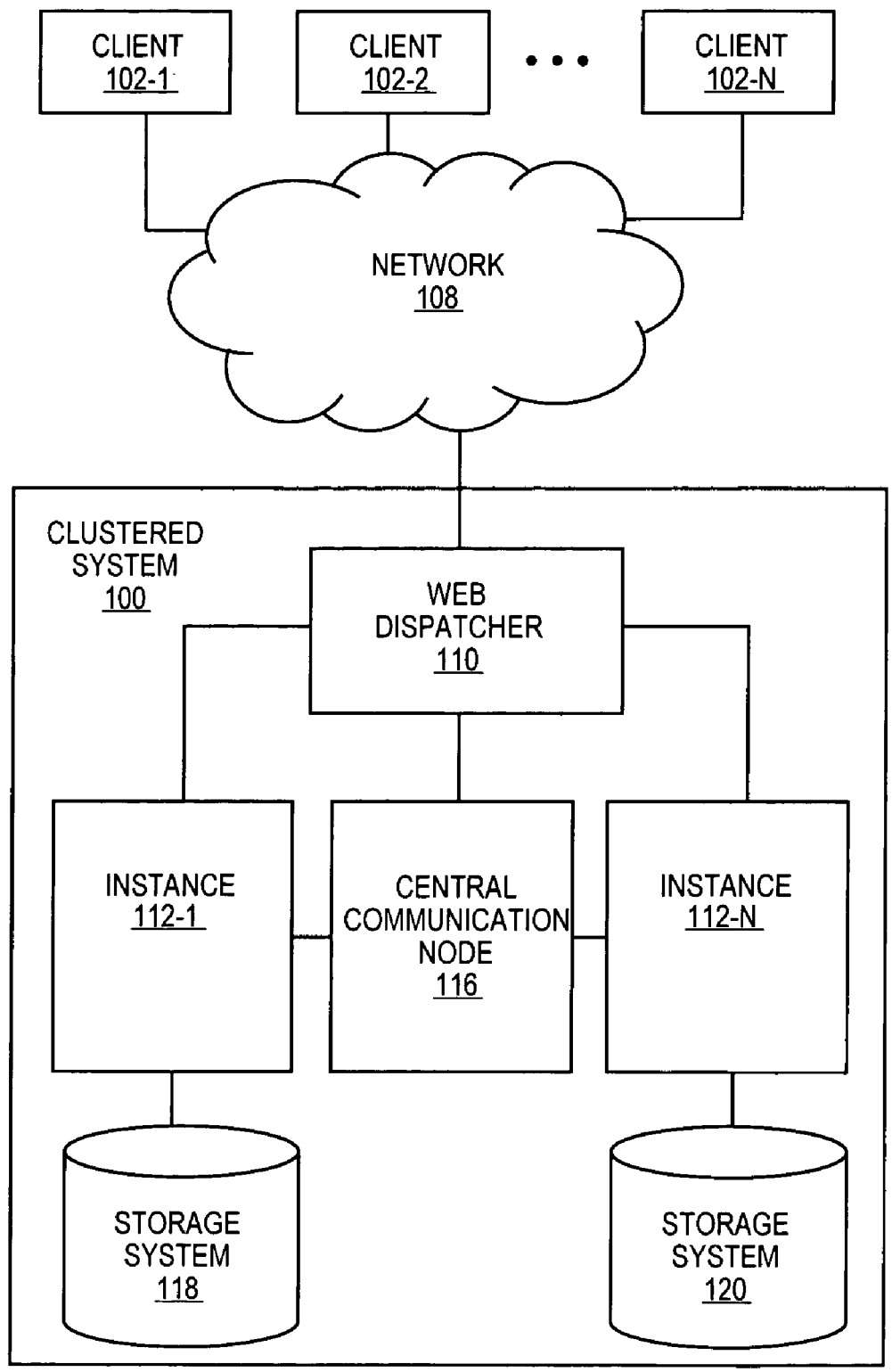
FIG. 1 shows a simplified representation of a clustered system coupled to client computers through a network according one embodiment of the invention.

FIG. 1 shows a simplified representation of a clustered system 100 coupled to client computers 102-1 through 102-N via a network 108 according to one embodiment of the invention. The clustered system 100 includes a set of instances 112-1 through 112-N that are coupled together through a central communication node 116. Each node, including the instances 112-1 through 112-N and the central communication node 116, contained within the clustered system 100 may include any number of server nodes. The server nodes contained within the instances 112-1 through 112-N may communicate with each other by sending packets to perform tasks requested by the client computers 102.

The clustered system 100 may be used to provide a scalable server environment that permits substantially real-time access to information for a distributed user base. In one embodiment, a dispatcher 110 is coupled between the network 108 and the instances 112-1 through 112-N to distribute requests from client computers 102 based on the load on the respective instances 112-1 through 112-N. The dispatcher may be, for example, a web dispatcher coupled to network 108 and web server nodes. The network 108 may be a local area network, a wide area network, the Internet, or any combination thereof. The network 108 may employ any type of wired or wireless communication channels capable of establishing communication between computing devices.

The instances 112-1 through 112-N contained within the clustered system may communicate with each other through the central communication node 116. The instances 112-1 and 112-N are coupled to one or more storage systems 118, 120. The storage systems 118, 120 provide storage for code and data that are used by the instances.

The clustered system 100 may include a number of Java instances running on a hardware system and a number of non-Java instances running on another hardware system. In one embodiment, the Java instances and the non-Java instances utilize separate storage systems. For example, one storage system 118 may coupled to the non-Java instances to provide storage for the non-Java instances and the other storage system 120 may be coupled to the Java instances to provide storage for the Java instances. Each instance (non-Java and Java) have one or more work processes, which are under control of a control logic executed within the corresponding instance. The control logic may be different for non-Java and Java instances.

Figure 2:
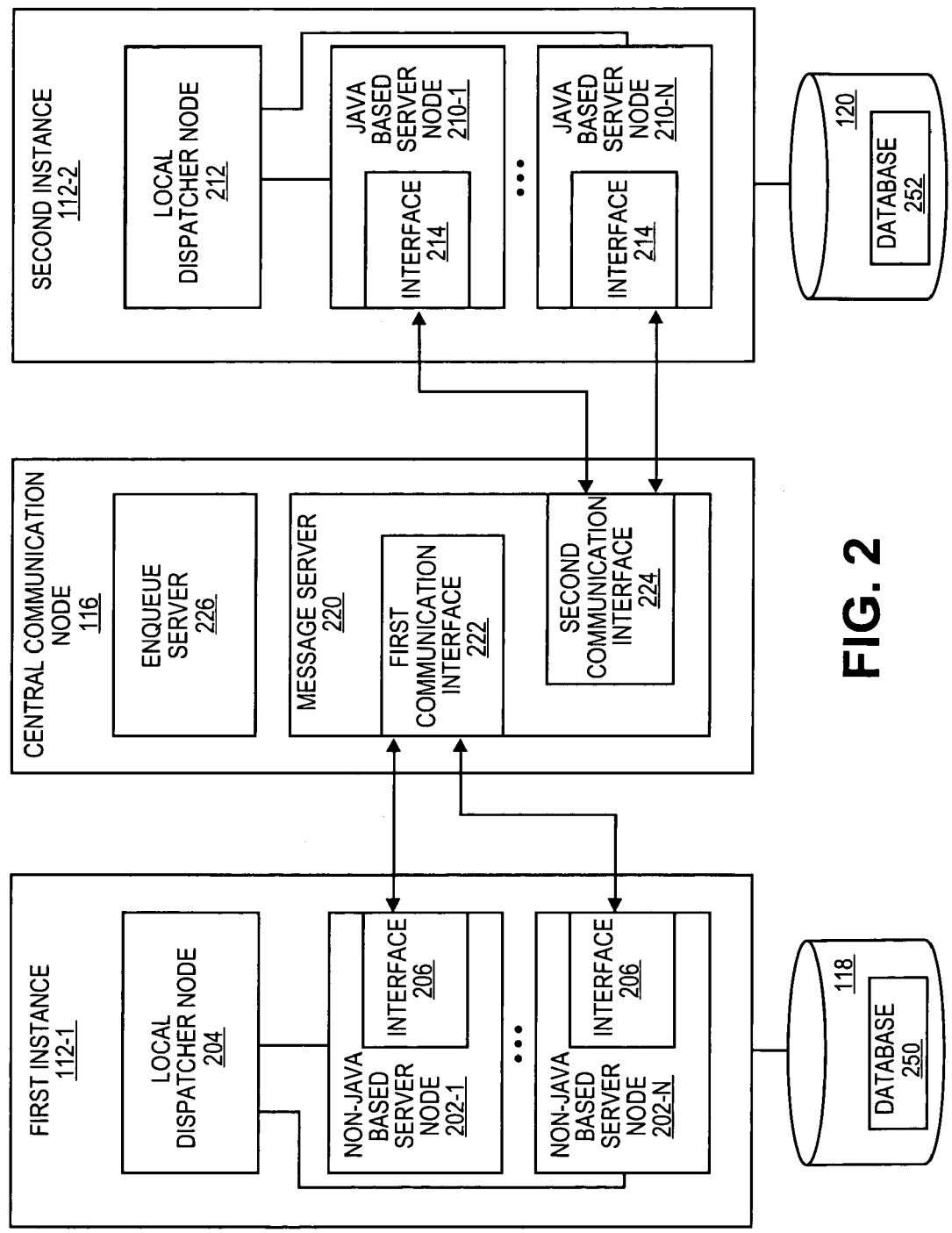
FIG. 2 shows a block diagram illustrating internal components of instances contained within a clustered system according to one embodiment of the invention.

FIG. 2 shows internal components of instances 112-1 and 112-2 according to one embodiment of the invention. Each instance includes two or more server nodes and a local dispatcher node, which dispatches requests from client computers across the multiple server nodes. In the illustrated embodiment, the first instance 112-1 includes non-Java-based server nodes 202-1 through 202-N. In one embodiment, the non-Java-based server nodes 202-1 through 202-N implement the Advanced Business Application Program (ABAP) platform. ABAP is a programming language for developing applications for the SAP R/3 system. The second instance 112-2 includes Java-based server nodes 210-1 through 210-N implementing Java 2 Platform Enterprise Edition (J2EE). J2EE is a Java platform that can be used to develop, deploy and maintain enterprise applications. Incorporating both the non-Java-based instance 112-1 and the Java-based instance 112-2 within the same clustered system enables the clustered system to handle requests intended for either Java applications or non-Java applications, such as ABAP applications. Although J2EE and ABAP programming models are described herein, it should be noted that the embodiments of the invention may be implemented with other programming models, such as, for example, WebDynpro, XI (Exchange Infrastructure) and Portals.

The clustered system 100 includes storage systems 118, 120 to provide storage for code and data that are used by the instances 112-1 and 112-2, respectively. In the illustrated embodiment, the instances 112-1 and 112-2 maintain separate storage systems. However, the clustered system 100 may be configured such that two or more instances contained therein share a single storage system. The storage systems 118, 120 are used to store a first database 250 maintained by the first instance 112-1 and a second database 252 maintained by the second instance 112-2. In the illustrated embodiment, the ABAP applications executed in the first instance 112-1 modify data in the first database 250, and the Java applications executed in the second instance 112-2 modify data in the second database 252.

Also illustrated in FIG. 2 is a central communication node 116 coupled between the first instance 112-1 and the second instance 112-2. The central communication node 116 includes an enqueue server 226 and a message server 220. The message server 220 is responsible for managing the communication between any two instances contained within the clustered system 100. In one embodiment, the non-Java instance 112-1 and the Java instance 112-2 use the message server 220 as their runtime repository and messaging system. The enqueue server 226 is responsible for providing central locking services in order to lock accesses to resources within the clustered system 100.

The message server 220 includes a first communication interface 222 to establish communication with the non-Java-based server nodes 202-1 through 202-N of the first instance 112-1, and a second communication interface 224 to establish communication with the Java-based server nodes 210-1 through 210-N of the second instance 112-2. In one embodiment, the communication between the non-Java-based server nodes 202 and the Java-based server nodes 210 is accomplished by synchronizing the packet header between packets generated by Java applications and packets generated by ABAP applications, in order to provide compatibility. In one embodiment, a Java library contained within each Java-based server node is configured to attach a header to a body of a packet that can be decoded by the non-Java-based instances (e.g., ABAP platform) and by a protocol layer of the message server 220.

Figure 3:
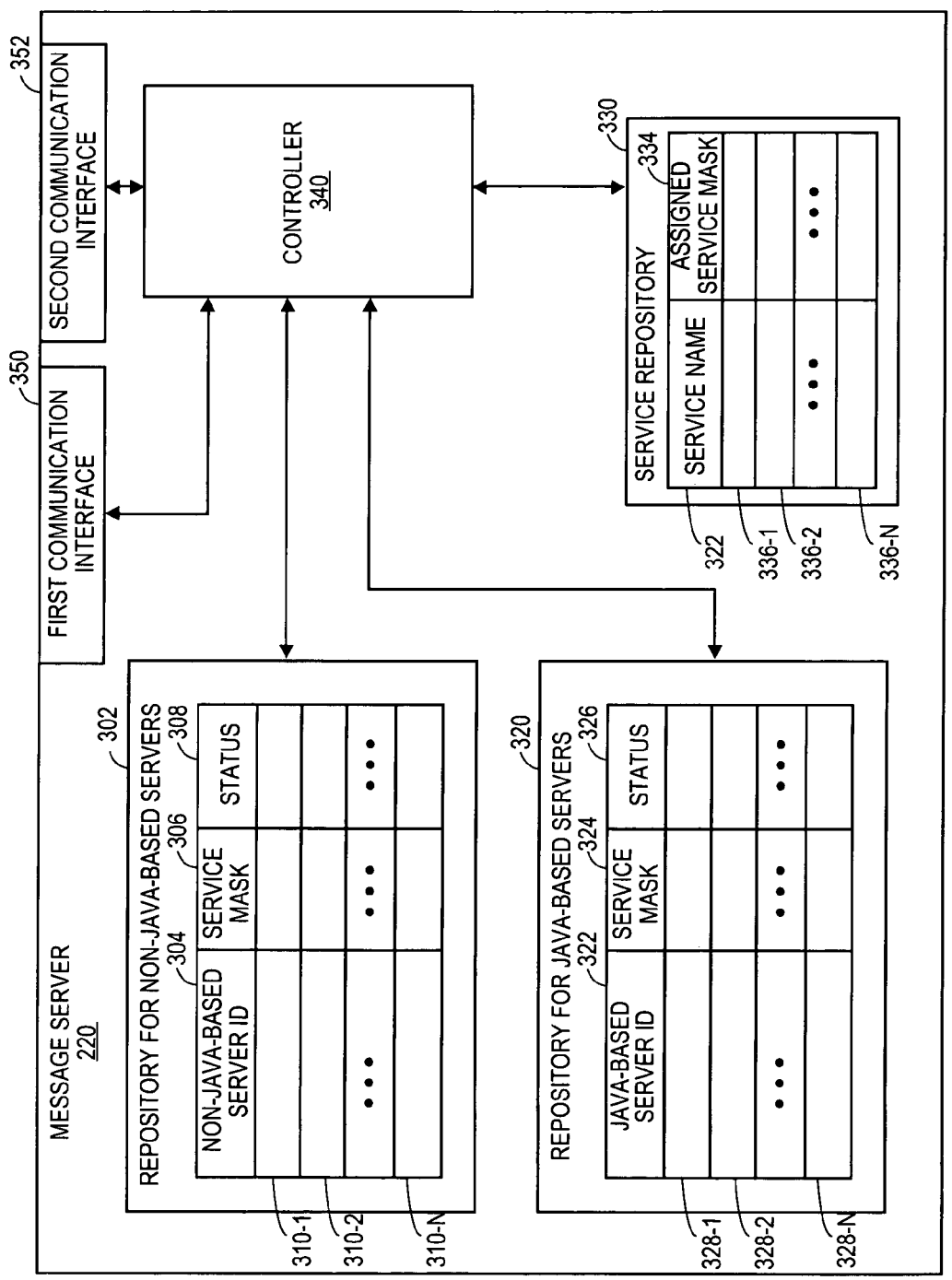
FIG. 3 shows a block diagram of a message server according to one embodiment of the invention.

FIG. 3 shows a simplified representation of a message server 220 according to one embodiment of the invention. In one embodiment, the message server 220 provides an infrastructure for data exchange between server nodes contained within a clustered system by maintaining a list of services (e.g., processes and tasks) performed by the server nodes. The message server 220 includes a first repository 302 to maintain a list of services performed by the non-Java-based server nodes. The first repository 302 includes a number of entry rows 310-1 through 310-N, each entry row used to store information relating to a service performed by a non-Java-based server node. In the illustrated embodiment, each entry row 310 of the first repository 302 is associated with [1] a Non-Java-Based Server ID column 304 to store the server identification number associated with a respective server node performing the service, [2] a Service Mask column 306 to identify the type of service, which is represented by a bit mask in one embodiment, and [3] a Status column 308 to contain information relating to the status of the service.

Similarly, the message server 220 further includes a second repository 320 to maintain a list of services performed by the Java-based server nodes. The second repository 320 includes a number of entry rows 328-1 through 329-N, each entry row used to store information relating to a service performed by a Java-based server node. In the illustrated embodiment, each entry row 328 of the second repository 320 is associated with [1] a Java-Based Server ID column 322 to store the server identification number associated with a respective server node performing the service, [2] a Service Mask column 324 to identify the type of service, and [3] a Status column 326 to contain information relating to the status of the service. The status column may contain data relating to the status of the services, such as starting, running, terminating, etc. In one context, the term "services" is used to describe any service, process, transaction or task performed by a server node or any suitable computing device.

In operation, the message server 220 receives status information from all of the server nodes contained within the clustered system and uses the status information to update its first and second repositories 302 and 320. Each of the non-Java-based server nodes 202-1 through 202-N periodically sends a packet indicating its status (running, stopped, etc), which may include other information such as access point, port address, etc to the message server. In response, the message server 220 updates its first repository 302 based on the information contained in the status packet. The message server 220 is also configured to send notification of events that arise in the clustered system. In one embodiment, the message server sends notification of the status of all of the server nodes contained within the clustered system, for example, to indicate if a particular server node has started, shut-down or restarted.

Additionally, the message server is configured to notify the status of all of the services performed by the server nodes. Specifically, the message server 220 uses the information contained in the first repository 302 to send notification of a status of each of the listed services to the first instance containing the non-Java-based server nodes. Based on the notifications, server nodes within an instance can determine which services have failed before completion and which services are available on which server nodes. Similarly, the message server 220 uses the information contained in the second repository 320 to send notification of a status of each of the listed services to the Java-based server nodes included in another instance. In one embodiment, the information contained in the first and second repositories 302 and 320 and 320 is also supplied to a central dispatcher, which uses this information to balance the load among various instances contained within the cluster.

In one embodiment, the message server 220 includes a controller 340, which is configured to dynamically assign service identifications associated with services performed by the server nodes. By dynamically assigning service identification during runtime, the message server 220 is able to accommodate new services and increases the flexibility of handling various sets of services performed by the clustered system. The message server 220 includes a service repository 330 to maintain a list of assigned service identifications and their corresponding service names. The service repository 330 includes a number of entry rows 336-1 through 336-N, each entry row used to store a service identification (referred to in FIG. 3 as an "Assigned Service Mask") associated with a particular service. In the illustrated embodiment, each entry row 336 of the service repository 330 is associated with [1] a Service Name column to store the name of a respective service, and [2] an Assigned Service Mask column to store identification of the respective service, which is represented by bit masks in one embodiment. In use, each time a service, which is not listed in the service repository 330, is performed by one of the server nodes, the controller 340 assigns a unique service mask for the corresponding service. Subsequently, whenever the same type of service is performed by one of the server nodes, it is identified by the same service mask assigned in the service repository 330.

Figure 4:
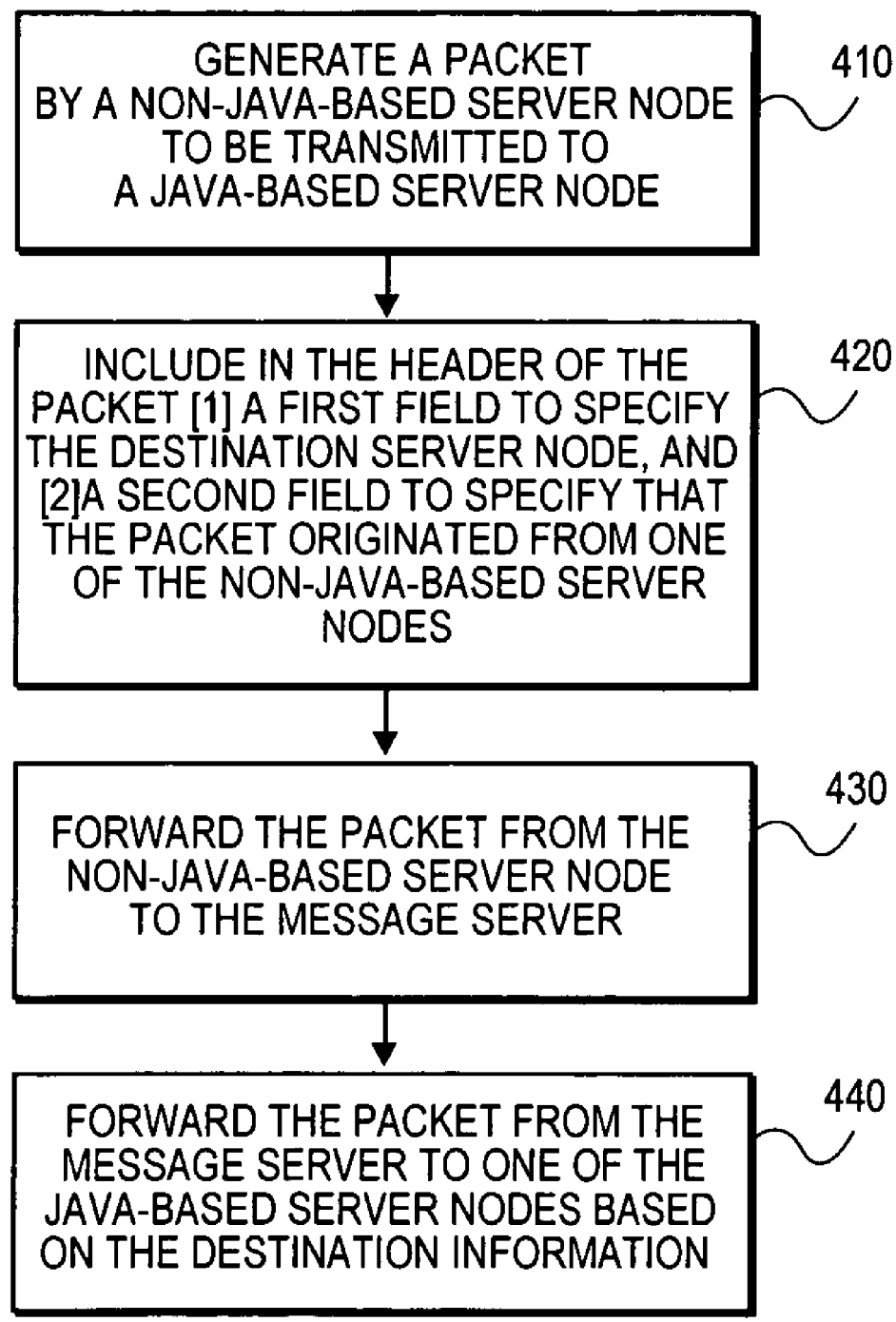
FIG. 4 shows a flowchart diagram illustrating operations involved in transmitting a packet from a non-Java-based server node to a Java-based server node according to one embodiment of the invention.

FIG. 4 shows general operations involved in transmitting a packet from a non-Java-based server node to a Java-based server node according to one embodiment of the invention. In block 410, a non-Java-based server node generates a packet to be transmitted to one of Java-based server nodes contained within a clustered system. The packet to be transmitted may be a message packet, a request packet or an acknowledgement, the packet including a header and a body. The header is attached to the body by a communication interface coupled to the non-Java-based server node. In one embodiment, the communication interface establishes communication with other servers by using C-libraries to implement a Java-native communication protocol.

In one embodiment, the packets originating from the non-Java-based server nodes specify in the header section that the packets were transmitted from the non-Java-based server nodes. In this regard, the communication interface of the non-Java-based server node configures the header section of the packet such that it includes, among other things, a first field that specifies the address of the destination server node and a second field that specifies the packet originated from one of the non-Java-based server nodes, in block 420. In one implementation, the second field of the header indicates that the packet originated from one of the server nodes implementing ABAP applications. Then, in block 430, the non-Java-based server node forwards the packet to message server 220 in the clustered system. Once the message server has received a packet, the protocol layer included in the message server is configured to route the packet to one of the Java-based server nodes based on the destination information included in the header of the packet.

Figure 5:
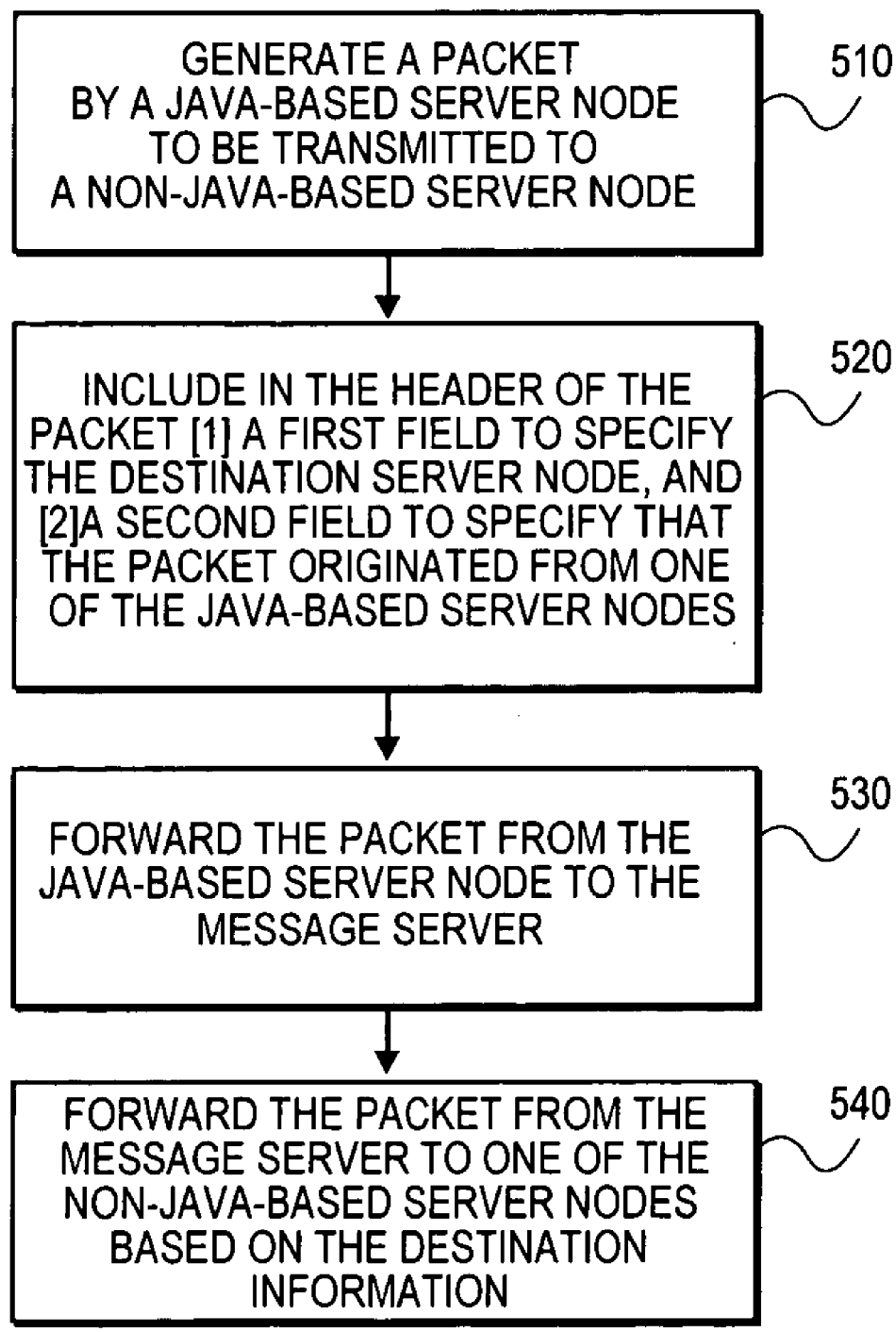
FIG. 5 shows a flowchart diagram illustrating operations involved in transmitting a packet from a Java-based server node to a non-Java-based server node according to one embodiment of the invention.

FIG. 5 shows general operations for transmitting a packet from a Java-based server node to a non-Java-based server node according to one embodiment of the invention. In block 510, a Java-based server node generates a packet to be transmitted to one of non-Java-based server nodes contained within a clustered system. The packet to be transmitted may be a message packet, a request packet or an acknowledgement packet. The packets each includes a header and a body. The header is attached to the body by a communication interface implemented within the Java-based server node. In one embodiment, the communication interface is implemented using a Java library.

In one embodiment, the packets originating from the Java-based server nodes specify in the header section that the packets were transmitted from the Java-based server nodes. In this regard, the communication interface of a Java-based server node configures the header section of the packet such that it includes, among other things, a first field that specifies the address of the destination server node and a second field that specifies the packet originated from one of the Java-based server nodes, in block 520. Then, in block 530, the Java-based server node forward the packet to a message server 220 in the clustered system. Once the message server has received a packet, the protocol layer included in the message server is configured to route the packet to one of the non-Java-based server nodes based on the destination information included in the header of the packet.

In one embodiment, a single centralized message server is used to coordinate processes executed in non-Java-based server nodes as well as the Java-based server nodes. This may be accomplished by synchronizing the packet header utilized by all server nodes included in the clustered system. In one embodiment, the packet headers generated by ABAP applications are compatible with the header of packets generated by Java application programs.

In one embodiment, a failover mechanism is implemented by the message server. This is accomplished by returning to the message server a confirmation for each message sent by the message server, the confirmation indicating that the message has been received by a component of the clustered system and sent to the corresponding recipient. In case a component of the clustered system fails and prevents the message from being sent to the recipient, the message server will know that the message has not been properly processed by virtue of not receiving a confirmation and will send the message again when the failed component is up and running. By implementing such a failover mechanism, there is a greater likelihood that the message transmitted by the message server will be processed and will not be lost.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising: establishing communication between a plurality of non-Java-based server node and a plurality of Java-based server nodes via an intermediate server, wherein Java-based server nodes are server nodes that implement java 2 Platform Enterprise Edition (J2EE) applications;

generating a packet, on a first non-Java-based server nodes, to be transmitted from one-of-the first non-Java-based server nodes to a first Java-based server nodes;

specifying in a header of the packet an address of the first Java-based server node and information that indicates that the packet is generated by the first non-Java-based server nodes;

forwarding the packet to the intermediate server from the first non-Java-based server nodes;

forwarding the packet to first Java-based server node from the intermediate server based on the address provided in the header of the packet, wherein the packet header is formatted to be compatible with the format of the first Java-based server node such that it can be decoded by the first Java-based server node, wherein the intermediate server providing interoperability of communications between the Java based server nodes and the non-Java based server nodes, maintaining a list of services, the list of services includes processes and tasks performed by the Java-based server nodes;

and maintaining a list of services, the list of services includes processes and tasks performed by the non-Java-based server nodes, wherein the maintained lists of services facilitate communications between the Java-based server nodes and the non-Java-based server nodes.

2. The method of claim 1, further comprising: generating a second packet to be transmitted from a second Java-based server node to a second non-Java-based server node;

specifying in a header of the second packet an address of the second non-Java-based server node and information that indicates that the packet is generated by the second Java-based server node;

forwarding the second packet to the intermediate server from the second Java-based server node;

and forwarding the second packet to the second non-Java-based server node from the intermediate server based on the address provided in the header of the second packet.

3. The method of claim 1, further comprising: sending notification of a status of each of the listed services to the non-Java-based server nodes such that the maintained lists of services can be updated.

4. The method of claim 1, further comprising: sending notification of a status of each of the listed services to the Java-based server nodes such that the maintained lists of services can be updated.

5. The method of claim 1, wherein the maintaining a list of services is accomplished by the intermediate server and the sending notification of a status of each of the listed services is accomplished by the intermediate server.

6. A system comprising: a plurality of non-Java-based server nodes, each of the non-Java-based server nodes executing software instructions to attach a header to a body of a packet, the header including information to specify that the packet originated from first non-Java-based server nodes wherein Java-based server nodes are server nodes that implement java 2 Platform Enterprise Edition (J2EE) applications;

a plurality of Java-based server nodes, each of the Java-based server nodes executing software instructions to attach a header to a body of a packet, the header including information to specify that the packet originated from a first Java-based server node;

a message server coupled between the Java-based server nodes and the non-Java-based server nodes to establish communication between the first Java-based server node and the first non-Java-based server node, by formatting each packet header such that it is compatible with a format of a destination server;

and an enqueue server coupled between the Java-based server nodes and the non-Java based server nodes to provide central locking services to lock access to resources in the system for use during communications between the first Java-based server node and the first non-Java-based server node such that communications between the first Java-based server node and the first non-Java based server node are not interrupted.

7. The system of claim 6, further comprising a dispatcher to distribute client requests for services to the Java-based server nodes and the non-Java based server nodes, such that the dispatcher distributes the load amongst the Java-based server nodes and the non-Java based server nodes during communications.

8. The system of claim 6, wherein the message server provides communications between the Java-based server nodes and the non-Java based server nodes by routing message packets between the non-Java-based server nodes and the Java-based server nodes.

9. The system of claim 6, wherein the message server is to assign a service identification associated with each type of services executed on the server nodes, wherein assigning the service identifications assists in providing communications between the Java-based server nodes and the non-Java based server nodes.

10. The system of claim 9, wherein the message server includes a service repository to maintain a list of the assigned service identification and corresponding service names, wherein maintaining the service identifications and the service names assists in providing communications between the Java-based server nodes and the non-Java based server nodes.

11. The system of claim 7, wherein the message server further comprises:

a first repository to maintain a list of services currently being executed on the non-Java-based server nodes;

and a second repository to maintain a list of services currently being executed on the Java-based server nodes, wherein the first and second repositories facilitate distribution of load by indicating currently executing services.

12. The system of claim 7, wherein the message server is to maintain a list of services performed by the Java-based server nodes and the non-Java based server nodes and a status corresponding to each of the listed services, and to send notification of the status of the listed services dispatcher such that the dispatcher distributes the load in each instance following requests for services.

13. A message server comprising: a first communication interface to establish communication with a plurality of non-Java-based server nodes;

a second communication interface to establish communication with a plurality of Java-based server nodes, wherein Java-based server nodes are server nodes that implement java 2 Platform Enterprise Edition (J2EE) applications;

and a controller to transfer packets between the non-Java-based server nodes and the Java-based server nodes, the controller to ensure the packets are received by a destination server node by resending the packets if a confirmation of receipt has not been received from the destination server node.

14. The message server of claim 13, wherein the controller is to assign a service identification associated with each type of services executed on the Java based server nodes and non-Java-based server nodes, wherein assigning the service identifications assists in providing communications between the first and second communications interfaces.

15. The message server of claim 14, further comprising: a service repository maintain a list of the assigned service identification and corresponding service names, wherein maintaining the service identifications and the service names assists in providing communications between the first and second communications interfaces.

16. The message server of claim 13, further comprising: a first repository to maintain a list of services currently being executed on the non-Java-based server nodes;

and a second repository to maintain a list of services currently being executed on the Java-based server nodes, wherein the first and second repositories facilitate distribution of load by indicating currently executing services.

17. The message server of claim 15, wherein the controller is to send notification of a status of each of the services listed in the first repository to the non-Java-based server nodes such that the maintained lists of services can be updated.

18. The message server of claim 15, wherein the controller is to send notification of a status of each of the services listed in the second repository to the Java-based server nodes such that the maintained lists of services can be updated.

19. A machine-readable medium that provides instructions, which when executed by a processor cause the processor to perform operations comprising:
    establishing communication with a plurality of non-Java-based server nodes;
    establishing communication with a plurality of Java-based server nodes, wherein Java-based server nodes are server nodes that implement java 2 Platform Enterprise Edition (J2EE) applications;
    transferring packets between the non-Java-based server nodes and the Java-based server nodes;
    and ensuring the packets are received by a destination server node by resending the packets if a confirmation of receipt has not been received from a destination server node.

20. The machine-readable medium of claim 19, wherein the operations performed by the processor further comprise: assigning a service identification associated with each type of services executed on the server nodes;
    and maintaining a list of the assigned service identification and corresponding service names, wherein maintaining the service identifications and the service names assists in providing communications between the non-Java-based server nodes and the Java-based server nodes.

21. The machine-readable medium of claim 19, wherein the operations performed by the processor further comprise: maintaining a list of services currently being executed on the non-Java-based server nodes in a first repository;
    and maintaining a list of services currently being executed on the Java-based server nodes in a second repository, wherein each list facilitates distribution of load by indicating currently executing services.

22. The machine-readable medium of claim 21, wherein the operations performed by the processor further comprise: sending notification of a status of each of the services listed in the first repository to the non-Java-based server nodes such that the maintained lists of services can be updated;
    and sending notification of a status of each of the services listed in the second repository to the Java-based server nodes such that the maintained lists of services can be updated.

23. A system comprising: means for generating a packet on a first non-Java based server node such that a header of the packet specifies an address of a first Java-based server node wherein Java-based server nodes are server nodes that implement java 2 Platform Enterprise Edition (J2EE) applications;
    means for indicating that the packet is generated by a non-Java based server node;
    means for forwarding the packet to intermediate communication means from the first non-Java-based server node, wherein the intermediate communication means provides interoperability of communications between the Java based server nodes and the non-Java based server nodes;
    and means for forwarding the packet to the first Java-based server node from the intermediate communication means based on the destination address provided in the header of the packet;
    means for maintaining a list of services, the list of services includes processes and tasks performed by the first Java-based server node, wherein maintaining the list of service identifications and the service names assists in providing communications between the first non-Java-based server node and the first Java-based server node;
    and means for sending notification of a status of each of the listed services to the first Java-based server node, the notification indicates whether the service is running or stopped such that the maintained list of services can be updated.

24. The system of claim 23, further comprising: means for generating a second packet on a second Java based server node such that a header of the second packet specifies an address of a second non-Java-based server node and that the second packet originated from a Java-based server nodes;
    means for forwarding the second packet to the intermediate communication means from second Java-based server nodes;
    and means for forwarding the second packet to the second non-Java-based server node from the intermediate communication means based on the destination address provided in the header of the second packet.

25. The system of claim 24, wherein the intermediate communication means further comprises: means for maintaining a list of services performed by the Java-based server nodes wherein maintaining the list assists in providing communications between the Java-based server nodes and the non-Java-based server nodes; and means for sending notification of a status of each of the listed services to the Java-based server nodes such that the maintained list of services can be updated.

26. The system of claim 25, wherein the intermediate communication means further comprises: means for maintaining a list of services performed by the non-Java-based server nodes wherein maintaining the list of service identifications and the service names assists in providing, communications between the non-Java-based server nodes and the Java-based server nodes;
    and means for sending notification of a status of each of the listed services to the non-Java-based server nodes such that the maintained list of services can be updated.

27. The system of claim 23, wherein the intermediate communication means further comprises: means for establishing communication with a plurality of non-Java-based server nodes;
    means for establishing communication with a plurality of Java-based server nodes;
    and means for transferring packets between the non-Java-based server nodes and the Java-based server nodes.

28. The system of claim 23, wherein the intermediate communication means further comprises: means for assigning a service identification associated with each type of services executed on the Java based server nodes and the non-Java based server nodes;
    and means for maintaining a list of the assigned service identification and corresponding service names, wherein maintaining the service identifications and the service names assists in providing communications between the Java-based server nodes and the non-Java-based server nodes.

29. A system comprising: a plurality of non-Java-based server nodes, each of the non-Java-based server nodes executing software instructions to attach a header to a body of a packet, the header including information to specify that the packet originated from a first non-Java-based server node;

a plurality of Java-based server nodes, each of the Java-based server nodes executing software instructions to attach a header to a body of a packet, the header including information to specify that the packet originated from a first Java-based server node, wherein Java-based server nodes are server nodes that implement java 2 Platform Enterprise Edition (J2EE) applications;

a message server coupled between the Java-based server nodes and the non-Java-based server nodes to establish communication between the first Java-based server node and the first non-Java-based server node by formatting each packet header such that it is compatible with a format of a destination server, the message server comprising:

a first repository to maintain a list of processes and tasks performed by the plurality of non-Java based server nodes, the first repository includes a plurality of rows each associated with a service performed by a non-Java based server and a plurality of columns which identify attributes associated with each service, the attributes include a server identification to indicate a server performing the service, a service mask to identify the type of service, and a status to indicate the status of the service;

a second repository to maintain a list of processes and tasks performed by the plurality of Java based server nodes, the second repository includes a plurality of rows each associated with a service performed by a Java based server and a plurality of columns which identify attributes associated with each service, the attributes include a server identification to indicate a server performing the service, a service mask to identify the type of service, and a status to indicate the status of the service;

and a third repository to maintain a list of assigned service identifications and their corresponding service names, the third repository includes a plurality of rows each associated with a service and a plurality of columns which identify attributes associated with each service, the attributes include a service name to indicate the name of the service and an assigned service mask to indicate the type of service.

* * * * *